US012242085B2

(12) United States Patent
Kikuta (10) Patent No.: US 12,242,085 B2
(45) Date of Patent: Mar. 4, 2025

(54) AERIAL IMAGE DISPLAY DEVICE (71) Applicant: Mitsubishi Electric Corporation, Tokyo (JP)

(72) Inventor: Hayato Kikuta, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 391 days.

(21) Appl. No.: 17/790,520

(22) PCT Filed: Feb. 26, 2020

(86) PCT No.: PCT/JP2020/007632
§ 371 (c)(1),
(2) Date: Jul. 1, 2022

(87) PCT Pub. No.: WO2021/171403
PCT Pub. Date: Sep. 2, 2021

(65) Prior Publication Data
US 2023/0035023 A1 Feb. 2, 2023

(51) Int. Cl.
G02B 30/56 (2020.01)

(52) U.S. Cl.
CPC .................... G02B 30/56 (2020.01)

(58) Field of Classification Search
CPC .. G02B 30/56; G02B 27/0093; H04N 13/122; H04N 13/366
See application file for complete search history.

(56) References Cited

U.S. PATENT DOCUMENTS

2010/0014053 A1* 1/2010 Brentnall, III ......... G03B 21/00
353/7
2010/0177402 A1 7/2010 Maekawa

FOREIGN PATENT DOCUMENTS

| JP | 2007-228315 A | 9/2007 |
| JP | 2009-25776 A | 2/2009 |
| JP | 2017-107218 A | 6/2017 |
| JP | 2019-35810 A | 3/2019 |
| JP | 2019-105726 A | 6/2019 |

OTHER PUBLICATIONS

International Search Report and Written Opinion mailed on Jul. 21, 2020, received for PCT Application PCT/JP2020/007632, filed on Feb. 26, 2020, 11 pages including English Translation.

* cited by examiner

Primary Examiner — Ryan D Howard
(74) Attorney, Agent, or Firm — XSENSUS LLP (57) ABSTRACT An aerial image display device includes an image display unit to display an image; an aerial image formation optical system to cause diffuse light emitted from the image display unit to form an image again in a different space by reflecting the light multiple times and allowing the light to pass through; and processing circuitry to acquire viewpoint position information on an observer viewing a point where the diffuse light is caused to form the image again by the aerial image formation optical system, and to control the image from the image display unit depending on an angle formed by a straight line connecting an end point of a retroreflective sheet and an eye of the observer and a straight line extending from the eye of the observer and reaching the retroreflective sheet right in front.

14 Claims, 5 Drawing Sheets

AERIAL IMAGE DISPLAY DEVICE

CROSS-REFERENCE TO RELATED APPLICATION

The present application is based on PCT filing PCT/JP2020/007632, filed Feb. 26, 2020, the entire contents of which are incorporated herein by reference.

TECHNICAL FIELD

The present disclosure relates to an aerial image display device that displays an image in the air where there is no display element.

BACKGROUND ART

There exists a system that adjusts an image displayed by a display device employing aerial image formation technology for displaying an image in the air where there is no display element, depending on an observer of the image. For example, in Patent Reference 1, it is made possible to let the observer perceive the aerial image when the observer is situated at a position where the light from the display device is visible, by controlling the presence or absence of the display depending on a viewpoint position of the observer with respect to the aerial image.

PRIOR ART REFERENCE

Patent Reference

Patent Reference 1: Japanese Patent Application Publication No. 2017-107218

SUMMARY OR THE INVENTION

Problem to be Solved by the Invention

When an arrangement structure in which an aerial image is projected onto a space on a traffic line along which the observer moves is employed, there is a problem in that light before forming the image in the space, as unnecessary light not turning into the image, is viewed by the observer just after the observer passes through an image formation position of the aerial image perceived.

The present disclosure has been made to resolve the above-described problem and makes it possible to let the observer perceive the aerial image with appropriate display quality without having the observer view the light before forming the image in the space.

Means for Solving the Problem

The present disclosure provides an aerial image display device including an image display unit to display an image, an aerial image formation optical system to cause diffuse light emitted from the image display unit to form an image again in a different space by reflecting the light multiple times and allowing the light to pass through, a viewpoint position information acquisition unit to acquire viewpoint position information on an observer viewing a point where the diffuse light is caused to form the image again by the aerial image formation optical system, and a display control processing unit to perform light blocking on the diffuse light from the image display unit when it is detected that the observer exists in a region between the aerial image formation optical system and the point of being caused to form the image again.

Effect of the Invention

According to the present disclosure, in an aerial image display device that forms an aerial image, in an arrangement structure in which the aerial image is projected onto a space on a traffic line along which the observer moves, it is possible to realize an aerial image display device that prevents the light before forming the image in the space from being viewed in the observer's visual field even when the observer is at a position just after passing through the aerial image, by performing the light blocking on the image from the image display unit when the observer position moving into the region from the aerial image formation optical system to the point of being caused to form the image again is detected.

MODE FOR CARRYING OUT THE INVENTION

Embodiments of the present disclosure will be described below with reference to the drawings.

First Embodiment

Figure 1:
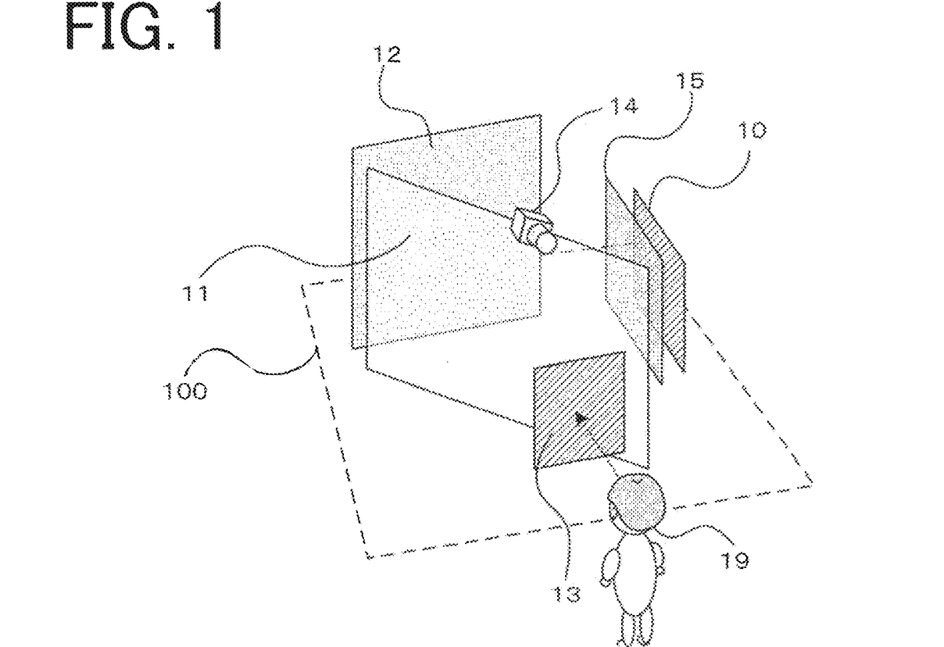
FIG. 1 is an explanatory diagram showing a configuration of an aerial image display device 100 in a first embodiment.

FIG. 1 is an explanatory diagram showing a configuration of an aerial image display device 100 in a first embodiment of the present disclosure. In FIG. 1, the aerial image display device 100 includes an image display unit 10, a beam splitter 11, a retroreflective sheet 12, a viewpoint position detection device 14 and a display control device 15. Further, the beam splitter 11 and the retroreflective sheet 12 form an aerial image formation optical system that causes diffuse light emitted from the image display unit 10 to form an image again in a different space by reflecting the light multiple times and allowing the light to pass through. The image display unit 10 sends a displayed image to the beam splitter 11 as light. The beam splitter 11 reflects the light from the image display unit 10 and sends the reflected light to the retroreflective sheet 12. The retroreflective sheet 12 reflects the light from the beam splitter 11 and sends the reflected light to the beam splitter 11. The beam splitter 11 allows the light to pass through from the retroreflective sheet 12. The light that passed through the beam splitter 11 is perceived by an observer 19 as an aerial image 13. The viewpoint position detection device 14 sends information obtained by detecting a viewpoint position of the observer 19 to the display control device 15. The display control device 15 has a function of controlling the display light from the image display unit 10 based on the information from the viewpoint position detection device 14.

The image display unit 10 is a device that receives an image input signal from a signal generator, an image playback device or the like, for example, as an input and outputs an image to be displayed as light. A display device including a liquid crystal element and a backlight such as a liquid crystal display, a display device as a self-luminous device employing an organic EL element or an LED element, and a projection device employing a projector and a screen can be taken as examples of the image display unit 10. Besides such two-dimensional planar light sources mentioned above, it is also possible to employ a display using a curved surface, a display arranged three-dimensionally, a stereoscopic display such as an LED, or a display that lets the observer perceive a stereoscopic image by means of binocular parallax and kinematic parallax by using a lens optical system and barrier control.

The beam splitter 11 is an optical element that splits incident light into transmitted light and reflected light. The beam splitter 11 is an acrylic plate or a glass plate, for example. In cases of an acrylic plate or a glass plate, the intensity of the transmitted light is generally high compared to the reflected light, and thus it is also possible to use an optical element as a half mirror having reflection intensity increased by adding metal to an acrylic plate or a glass plate. Further, it is possible to use a reflective polarizing plate whose reflecting behavior and transmitting behavior change depending on the condition of polarization of the incident light by a liquid crystal element or a thin film element. Furthermore, it is possible to use a reflective polarizing plate in which the ratio between transmittance and reflectance changes depending on the condition of the polarization of the incident light by a liquid crystal element or a thin film element.

The retroreflective sheet 12 is a sheet-like optical element having the retroreflection function to reflect incident light directly towards the direction of incidence. Optical elements realizing the retroreflection include optical elements of a bead type made by closely arranging small glass beads like a mirror surface, optical elements of a microprism type made by closely arranging minute trigonal pyramids in convex shapes each of whose surfaces is formed as a mirror surface or closely arranging shapes formed by removing central parts of the trigonal pyramids, and so forth.

Figure 2:
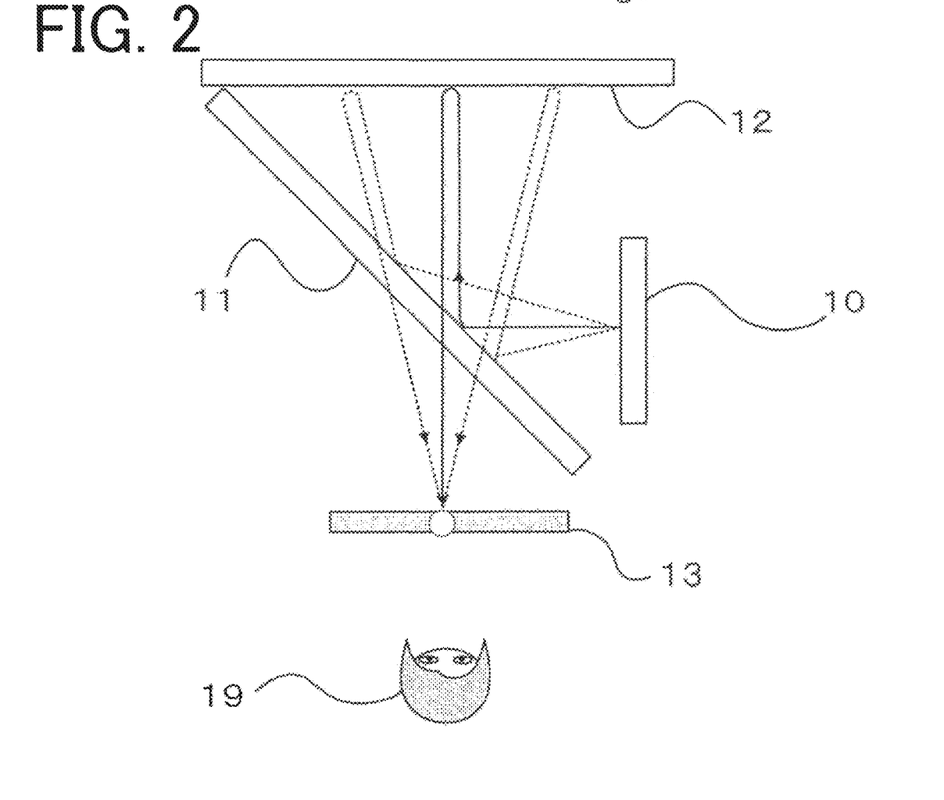
FIG. 2 is an explanatory diagram showing light from an image display unit 10 in the first embodiment until the light forms an image in the air.

FIG. 2 is an explanatory diagram showing the light from the image display unit 10 in the first embodiment of the present disclosure until the light forms an image in the air. The aerial image display device in this embodiment arranges the beam splitter 11 and the retroreflective sheet 12 to be paired with the image display unit 10. The light of the image from the image display unit 10 is reflected by the beam splitter 11 and the light undergoes the retroreflection by the retroreflective sheet 12, by which the light is reconverged in the air so that the solid lines and the dotted lines in FIG. 2 representing optical paths of the light of the image from the image display unit 10 converge on one point. Since the reconverged light is visible to the observer 19, the observer 19 perceives that the image exists at the position of the aerial image 13.

Further, the optical system is not limited to the above-described structure as long as the optical system has structure that makes the observer 19 perceive that the image exists at the position of the aerial image 13. For example, it is possible to employ a structure making use of a dihedral corner reflector array, such as a structure obtained by arranging the beam splitters 11 and the retroreflective sheets 12 in an array on a flat surface while stacking together two mirror surfaces orthogonal to each other or a structure implementing the mirror surfaces by using internal reflection in structures made of resin. Light incident in the direction of one mirror surface of this structure is reflected by the other mirror surface and the light reaches a position symmetrical with respect to this element structure. Light from a similar diffusive light source undergoing similar reflection can reconverge similarly to FIG. 1 and thereby let the observer perceive an aerial image.

The viewpoint position detection device 14 detects the viewpoint position. The viewpoint position is the position where the eyes of the observer 19 exist, for example. The viewpoint position detection device 14 is, for example, an image capturing device such as a camera. The viewpoint position detection device 14 detects the viewpoint position by obtaining three-dimensional position information on the observer 19 by using a compound eye camera, for example. Even in a case where the camera is a monocular camera for only the visible light region, for example, the viewpoint position detection device 14 detects the viewpoint position based on three-dimensional position estimation by use of an optical flow and feature points of the face and the skeletal structure. The viewpoint position detection device 14 detects viewpoint position information 20 by obtaining a speed and a reflection pattern of infrared light by using a camera that captures an image of infrared light and a device that emits the infrared rays. The viewpoint position information 20 is information indicating the position where the eyes of the observer 19 exist, for example. Besides using such a camera image capturing element, the viewpoint position detection device 14 may employ a method of emitting a radio wave or a waveform propagating in a three-dimensional space such as a magnetic field or sound and estimating the viewpoint position information 20 on a person based on the time and the pattern of acquisition of the emitted waveform by a device receiving the wave as an input. Alternatively, the viewpoint position detection device 14 obtains the viewpoint position information 20 based on the position where the observer is standing detected by setting a pressure sensitive sensor at a foot position where the observer is supposed to be situated.

Figure 3:
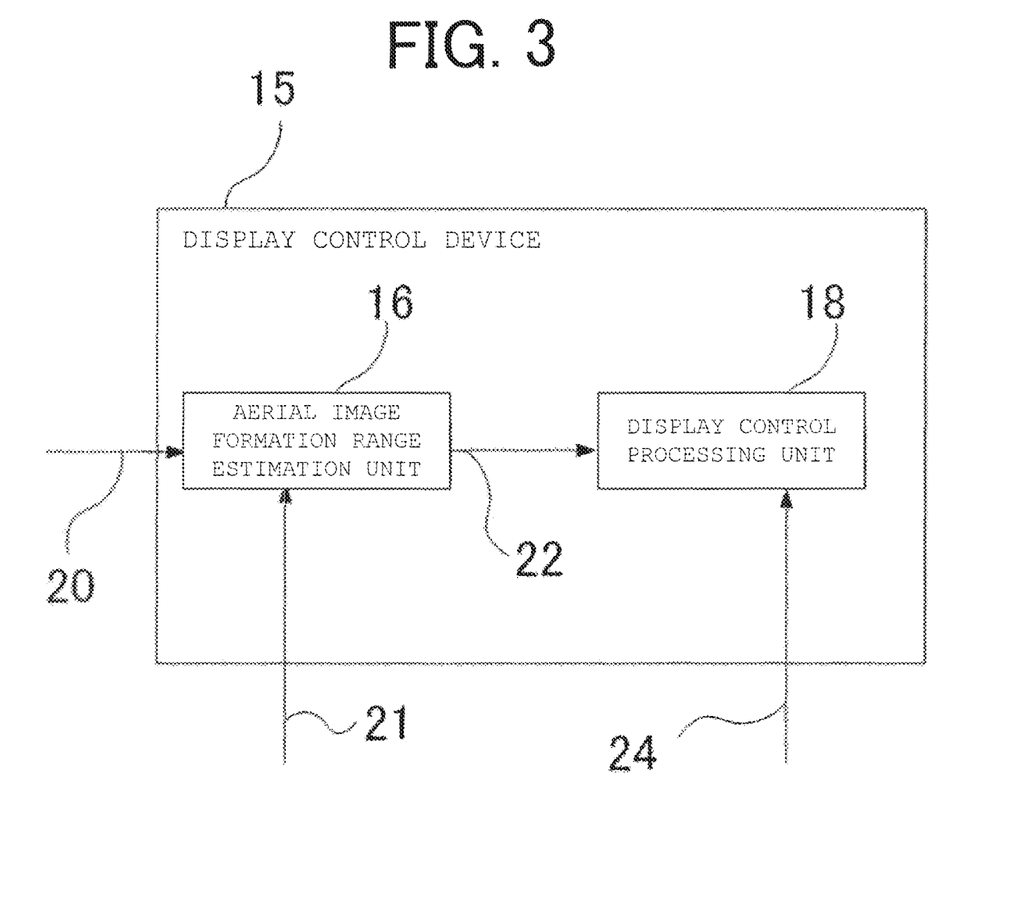
FIG. 3 is a block diagram showing a configuration of a display control device 15 in the first embodiment.

FIG. 3 is a block diagram showing a configuration of the display control device 15. The display control device 15 includes an aerial image formation range estimation unit 16 and a display control processing unit 18. The display control device 15 receives the viewpoint position information 20 as an input and executes display control. The aerial image formation range estimation unit 16 receives the viewpoint position information 20 and aerial image formation structure information 21 as inputs and outputs aerial image formation range information 22 to the display control processing unit 18. The aerial image formation range information 22 is position information that three-dimensionally indicates the position where the aerial image is formed. The aerial image formation structure information 21 is information indicating a positional relationship among optical system members of the image display unit 10, the beam splitter 11 and the retroreflective sheet 12 necessary for forming the aerial image 13. For example, the aerial image formation structure information 21 is three-dimensional CAD information on each member indicating the arrangement position and the shape of each member in the three-dimensional space. The display control processing unit 18 receives the aerial image formation range information 22 and display image information 24 as inputs and controls the display light. The details of the processing by each block will be described below. The observer 19's viewing of light other than the light forming the aerial image 13 can be taken as an example of a factor deteriorating the image perceived by the observer 19.

The aerial image formation range estimation unit 16 estimates a range where the aerial image perceivable by the observer 19 is formed based on the viewpoint position information 20 acquired from a viewpoint position information detection unit and the aerial image formation structure information 21 including an optical arrangement structure in the aerial image display device 100 in which the aerial image is formed.

For example, in an aerial image formation structure employing the retroreflection, the observer 19 can perceive the aerial image 13 if the beam splitter 11 exists on the observer 19's line of sight when the observer 19 is viewing in the direction of the aerial image 13 and the retroreflective sheet 12 exists on a line of transmission through the beam splitter 11 or a line of reflection from the beam splitter 11. Namely, the aerial image formation range estimation unit 16 is capable of estimating the range perceived by the observer 19 as the aerial image in a display region outputted by the image display unit 10 by executing three-dimensional optical path tracking based on both of the viewpoint position information 20 and the aerial image formation structure information 21.

As described above, the viewpoint position information 20 on the observer 19 is detected and outputted by the viewpoint position detection device 14. Further, the aerial image formation range information 22 is outputted from the aerial image formation range estimation unit 16. It can be presumed that the observer 19 falls into the state of being incapable of perceiving the aerial image 13 when the viewpoint position of the observer 19 moves through the image formation position of the aerial image 13 and is situated at a position closer to the beam splitter 11 than the image formation position of the aerial image 13, that is, when the observer 19 moves from a region situated after the point where the diffuse light is caused to form the image again by the aerial image formation optical system made up of the beam splitter 11 and the retroreflective sheet 12 to a region between the aerial image formation optical system and the point where the diffuse light is caused to form the image again.

The estimation of the image formation position of the aerial image 13 is possible also in the aforementioned dihedral corner reflector array structure. In the case of the dihedral corner reflector array structure, the optical path is formed by reflection of the incident optical path once by each mirror surface. Therefore, according to the relationship among the structure, the light source and the incidence angle, it can be presumed that an image is not perceived by the observer 19 as an aerial image when the reflection occurs once or less or three times of more.

The display control processing unit 18 executes control of performing the light blocking on the optical path for forming the aerial image 13 based on the aerial image formation range information 22 and the display image information 24. Control by extinguishing the image display unit 10 can be taken as an example of the light blocking control method. Control by extinguishing a backlight part of a liquid crystal display or the like in the image display unit 10 can be taken as another example of the light blocking control method. Control by extinguishing each light source of an organic EL display, an LED display or the like in the image display unit 10 can be taken as another example of the light blocking control method. Control by editing the values of all the pixels in the display image information 24 into zero can be taken as another example of the light blocking control method. Control by using an optical film or a physical light blocking device can be taken as another example of the light blocking control method. The light blocking device is installed in an optical path until the light emitted by the image display unit 10 reaches the observer 19 as the aerial image 13 and enables the light blocking control by means of an electronic shutter or a curtain. Control by changing the values of all the pixels in the image input signal into zero and supplying the changed signal to the image display unit 10 can be taken as another example of the light blocking control method.

Figure 4:
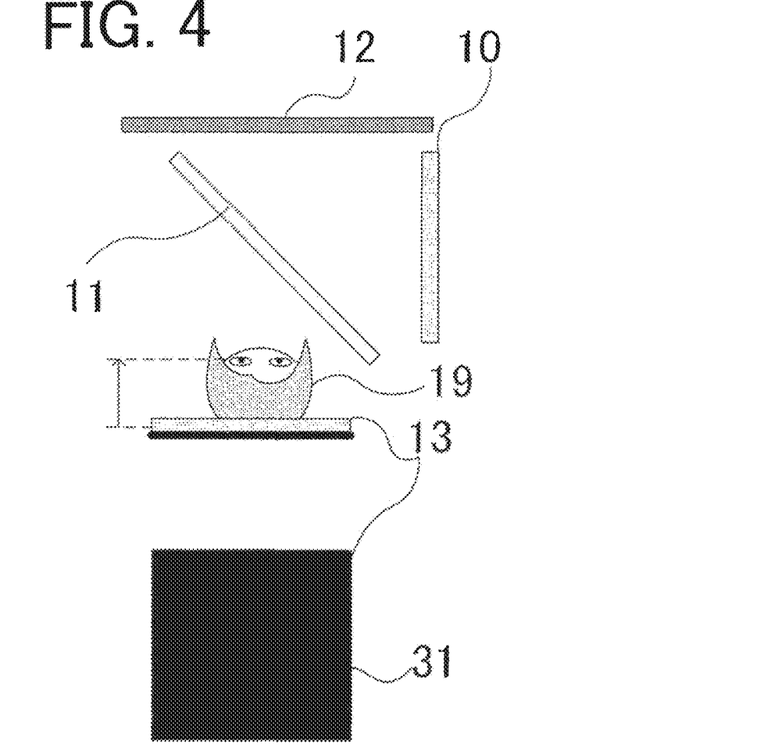
FIG. 4 is an explanatory diagram showing an example of control when an observer 19 is situated at a position closer to a beam splitter 11 than an image formation range of an aerial image 13 in the first embodiment.

FIG. 4 is an explanatory diagram showing an example of the control when the observer 19 is situated at a position closer to the beam splitter 11 than the position of the aerial image 13. Since the observer 19 unintendedly views the optical path before forming the aerial image 13, the control is executed so as to eliminate a feeling of discomfort caused by viewing the image light as uncomfortable light by performing the light blocking on a region of light viewed by the observer 19 as a display light blocking region 31.

The aerial image display device configured as above estimates the deterioration in the image quality of the aerial image 13 and performs the light blocking on the optical path for forming the aerial image 13 based on the result of the estimation, thereby making it possible to let the observer perceive the aerial image alone of appropriate display quality without viewing light visually uncomfortable to the observer.

Second Embodiment

In this embodiment, a description will be given of an image quality conversion process of controlling the display image quality by estimating the image quality of the aerial image 13 perceived by the observer 19.

Figure 5:
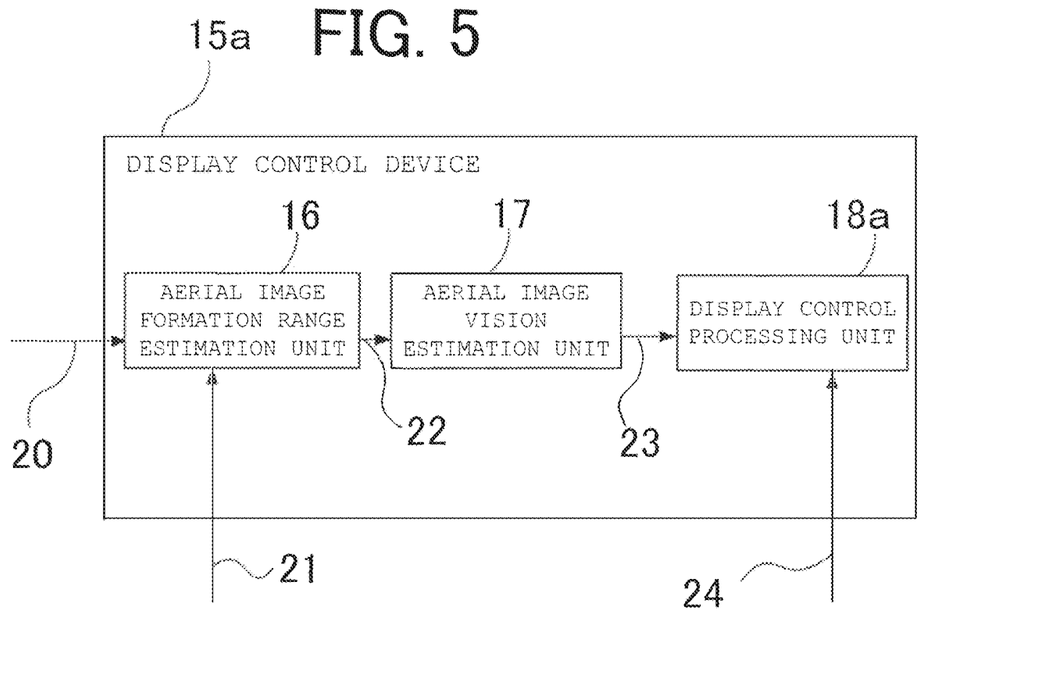
FIG. 5 is a block diagram showing a configuration of a display control device 15a in a second embodiment.

FIG. 5 is a block diagram showing a configuration of a display control device 15*a*. While the display control device 15 in the first embodiment is replaced by the display control device 15*a* in this embodiment, the rest of the configuration is the same as that in the first embodiment. The display control device 15*a* includes the aerial image formation range estimation unit 16, an aerial image vision estimation unit 17 and a display control processing unit 18*a*. The display control device 15*a* receives the viewpoint position information 20, the aerial image formation structure information 21 and the display image information 24 as inputs and executes the display control. The aerial image formation range estimation unit 16 receives the viewpoint position information 20 and the aerial image formation structure information 21 as inputs and outputs the aerial image formation range information 22 to the aerial image vision estimation unit 17. The aerial image vision estimation unit 17 receives the aerial image formation range information 22 as an input and outputs aerial image quality estimation information 23 to the display control processing unit 18*a*. The aerial image quality estimation information 23 is information indicating the image quality of the aerial image 13 perceived by the observer. The aerial image quality estimation information 23 can include a luminance value indicating brightness when white luminance is displayed, information indicating a contrast ratio when white luminance and black luminance are displayed to adjoin each other, or information indicating chromaticity when color such as R, G or B is displayed, for example. The display control processing unit 18*a* receives the aerial image quality estimation information 23 and the display image information 24 as inputs and controls the display light. The details of the processing by each block will be described below. The display image information 24 is inputted from a signal generator or the like, for example.

The aerial image vision estimation unit 17 estimates the image quality of the aerial image 13 viewed by the observer 19 in the range perceivable as the aerial image obtained by the aerial image formation range estimation unit 16.

An image quality estimation method in regard to the left and right eyes employed by the aerial image vision estimation unit 17 will be described in detail below. First, optical paths that connects each pixel at the image formation position of the aerial image and each of both eyes are estimated. A three-dimensional straight line connecting a target aerial image pixel and the right eye and a three-dimensional straight line connecting the target aerial image pixel and the left eye are calculated, and the angle of intersection of each of these straight lines and the retroreflective sheet 12 is calculated.

In the aerial image formation structure employing the retroreflection, the image quality of the image due to the light viewed by each eye changes depending on the configured optical system members and the position of the observer. In this embodiment, in the aerial image 13 perceived by the observer 19, the image quality of each pixel of the image due to the light viewed by each of the right eye and the left eye is estimated and mapped as a parameter. The image quality mentioned in this embodiment is image quality perceived by the observer 19, and can include brightness, sharpness or chromaticity of the aerial image 13 perceived by the observer 19, for example. The brightness and the sharpness of the aerial image 13 perceived by the observer 19 change when an angle formed by a straight line connecting an end point of the retroreflective sheet 12 and an eye and a straight line extending from the eye and reaching the retroreflective sheet 12 right in front becomes large, that is, when the observer 19 is too close to the image formation position of the aerial image 13. For example, in cases where a film material, a polarizing film or the like that optically changes the wavelength is used for the surface of the beam splitter 11 or the retroreflective sheet 12, depending on the incidence angle of the light perceived by the observer 19 as the aerial image 13, there occurs diffraction, a change in the wavelength or the reflectance/transmittance due to polarization, or the like, and the brightness and the chromaticity of the perceived aerial image 13 change.

Further, the observer 19's viewing of light other than the light forming the aerial image 13 can be taken as an example of a factor deteriorating the image perceived by the observer 19. For example, when the beam splitter 11 is made of a material with a great plate thickness and both surfaces are equivalent to each other in reflectance and transmittance, there are cases where reflection and transmission when the aerial image 13 is formed are performed on the both surfaces and two aerial images 13 differing in the image formation range are formed. In such cases, the light for the perception of the aerial image 13 is viewed doubly and the sharpness of the aerial image is deteriorated. Furthermore, there are cases where a mirror image is viewed to exist at a position behind the retroreflective sheet 12 due to specular reflection occurring on the surface of the retroreflective sheet 12 instead of the retroreflection. This mirror image interferes with the aerial image 13 and can cause deterioration in the image quality of the aerial image 13 perceived by the observer 19.

Figure 6:
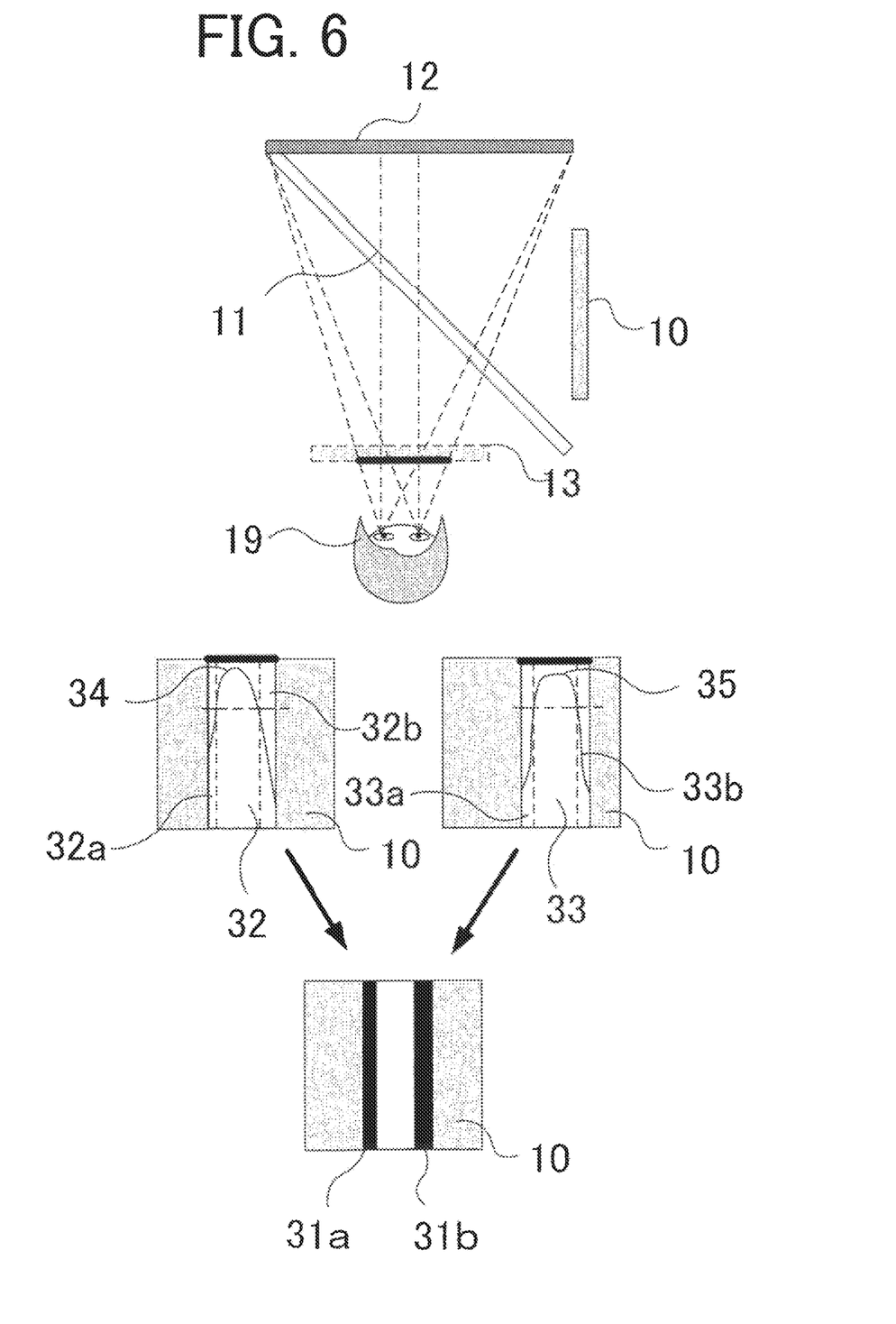
FIG. 6 is an explanatory diagram showing an example of the control when the observer 19 is situated at a position farther from the beam splitter 11 than the image formation range of the aerial image 13 in the second embodiment and close to the image formation range of the aerial image 13.

FIG. 6 is an explanatory diagram showing an example of the control when the observer 19 is situated at a position farther from the beam splitter 11 than the image formation range of the aerial image 13 and close to the image formation range of the aerial image 13. Since the image displayed by the image display unit 10 turns into the aerial image 13 as the result of the image formation, a visual perception region of each eye and a light blocking region or control region will be described below by using a display range of the image display unit. A sharpness level 34 of the image due to the light perceived by the observer 19 decreases as an angle formed by a straight line connecting an end point of the retroreflective sheet 12 on the left side and the left eye and a straight line extending from the left eye and reaching the retroreflective sheet 12 right in front becomes larger. Specifically, the sharpness level 34 in a visual perception region 32 of the left eye decreases on the left side compared to a part in the vicinity of the center. The visual perception region 32 of the left eye where the sharpness level 34 is less than or equal to a previously set threshold value is represented as a region 32*a*. Incidentally, the threshold value is set based on a perceivable contrast ratio or luminance on the basis of visual features of the human.

The sharpness level 34 of the image perceived due to the light viewed by the observer 19 decreases similarly as an angle formed by a straight line connecting an end point of the retroreflective sheet 12 on the right side and the left eye and a straight line extending from the left eye and reaching the retroreflective sheet 12 right in front becomes larger. Specifically, the sharpness level 34 in the visual perception region 32 of the left eye decreases on the right side compared to the part in the vicinity of the center. The visual perception region 32 of the left eye where the sharpness level 34 is less than or equal to the previously set threshold value is represented as a region 32*b*.

A sharpness level 35 of an image perceived due to the light viewed by the observer 19 decreases as an angle formed by a straight line connecting the end point of the retroreflective sheet 12 on the left side and the right eye and a straight line extending from the right eye and reaching the retroreflective sheet 12 right in front becomes larger. Specifically, the sharpness level 35 in a visual perception region 33 of the right eye decreases on the left side compared to a part in the vicinity of the center. The visual perception region 33 of the right eye where the sharpness level 35 is less than or equal to the previously set threshold value is represented as a region 33*a*.

Further, the sharpness level 35 of the image perceived due to the light viewed by the observer 19 decreases as an angle formed by a straight line connecting the end point of the retroreflective sheet 12 on the right side and the right eye and the straight line extending from the right eye and reaching the retroreflective sheet 12 right in front becomes larger. Specifically, the sharpness level 35 in the visual perception region 33 of the right eye decreases on the right side compared to the part in the vicinity of the center. The visual perception region 33 of the right eye where the sharpness level 35 is less than or equal to the previously set threshold value is represented as a region 33*b*.

In regions with decreased sharpness levels such as the region 32a, the region 32b, the region 33a and the region 33b, the observer 19 is unlikely to feel that both eyes are viewing the same pixel, cannot perceive a positional relationship regarding the aerial image 13, and feels that the light is uncomfortable light. Therefore, it is desirable to block the light in regard to pixels in a part where the image quality perceived by the observer 19 differs greatly. Specifically, in a region as a combination of the visual perception region 32 of the left eye and the visual perception region 33 of the right eye, a control operation of performing the light blocking on a region 31a as the region 32a or the region 33a and a region 31b as the region 32b or the region 33b is executed.

Figure 7:
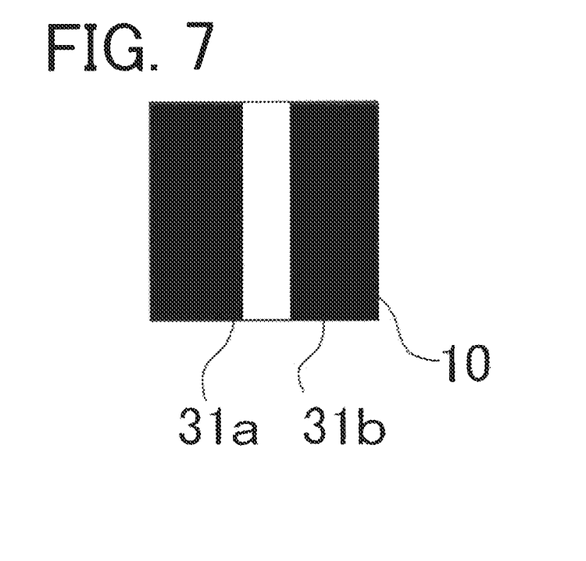
FIG. 7 is an explanatory diagram showing a region 31a and a region 31b in the image display unit 10 in the second embodiment.

FIG. 7 is an explanatory diagram showing the region 31a and the region 31b in the image display unit 10. While a light blocking range is determined inside the region as the combination of the visual perception region 32 of the left eye and the visual perception region 33 of the right eye in the above description, it is also possible to widen the light blocking range by expanding the region 31a and the region 31b to the outside of the region as the combination of the visual perception region 32 of the left eye and the visual perception region 33 of the right eye in the image display unit 10.

Figure 8:
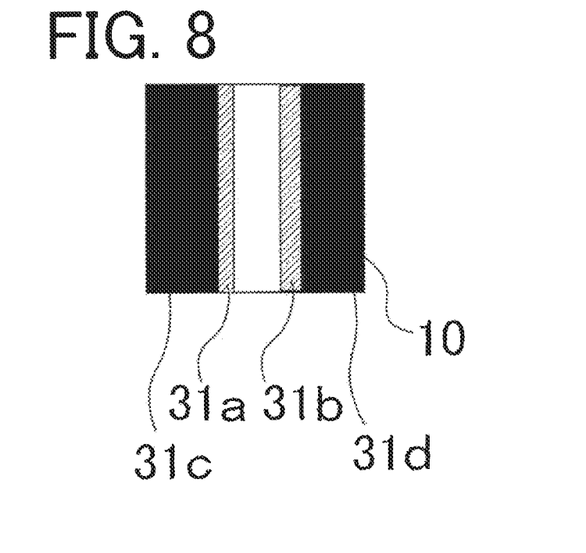
FIG. 8 is an explanatory diagram showing the region 31a, the region 31b, a region 31c and a region 31d in the image display unit 10 in the second embodiment.

FIG. 8 is an explanatory diagram showing the region 31a, the region 31b, a region 31c and a region 31d in the image display unit 10. A region on the left side relative to the region 31a is represented as the region 31c. Further, a region on the right side relative to the region 31b is represented as the region 31d. While the control in the above description is executed so as to perform the light blocking on regions felt as uncomfortable light to the observer 19, it is also possible, for example, to execute control of performing a filter process of reducing the brightness and the sharpness in the region 31a and the region 31b on the display image information 24 and thereby making it less likely to visually recognize a change in the image quality felt by each eye such as blurring, a change in the brightness or a change in the contrast, while blocking the light in the region 31c and the region 31d.

The display control processing unit 18a executes control of changing the image quality of the aerial image 13 based on the aerial image quality estimation information 23. As the control method of the image quality of the aerial image 13, a control method by applying an optical filter to the image light source can be taken as an example. For example, it becomes possible to locally change the brightness and resolution of the aerial image 13 by arranging a diffusive film or a phase difference film and mechanically controlling its installation position and angle. Further, as the control method of the image quality of the aerial image 13, controlling the display image quality by performing the filter process or a color conversion process on the display image information 24 inputted to the image display unit 10 can be taken as another example. In the filter process, it is possible to control the sharpness and the feel of resolution by using a filter for each frequency region of the inputted display image information 24. Furthermore, as the image quality control method, it is also possible, for example, to employ a method of performing the filter process or the color conversion process on the image input signal and supplying the processed image input signal to the image display unit 10.

The aerial image display device configured as above makes it possible to perceive the aerial image appropriately even when the angle formed by the straight line connecting an end point of the retroreflective sheet 12 and an eye and the straight line extending from the eye and reaching the retroreflective sheet 12 right in front becomes large when the observer is situated at a position farther from the beam splitter 11 than the image formation range of the aerial image 13 and close to the image formation range of the aerial image 13.

While embodiments of the present disclosure have been described as above, the present disclosure is not limited to these embodiments.

DESCRIPTION OF REFERENCE CHARACTERS 10 image display unit
11 beam splitter
12 retroreflective sheet
13 aerial image
14 viewpoint position detection device
15 display control device
16 aerial image formation range estimation unit
17 aerial image vision estimation unit
18 display control processing unit
19 observer
20 viewpoint position information
21 aerial image formation structure information
22 aerial image formation range information
23 aerial image quality estimation information
24 display image information
31 display light blocking region
32 visual perception region of left eye
33 visual perception region of right eye
100 aerial image display device

What is claimed is:

1. An aerial image display device comprising:
an image display to display an image;
an aerial image formation optical system to cause diffuse light emitted from the image display to form an image again in a different space by reflecting the light multiple times and allowing the light to pass through; and
processing circuitry
to acquire viewpoint position information on an observer viewing a point where the diffuse light is caused to form the image again by the aerial image formation optical system, and
to control the image from the image display depending on an angle formed by a straight line connecting an end point of a retroreflective sheet and an eye of the observer and a straight line extending from the eye of the observer and reaching the retroreflective sheet right in front.

2. The aerial image display device according to claim 1, wherein the processing circuitry executes the control so as to perform light blocking on a region in the light emitted by the image display.

3. The aerial image display device according to claim 1, wherein the processing circuitry performs light blocking on the diffuse light from the image display when it is detected that the observer exists in a region between the aerial image formation optical system and the point of being caused to form the image again.

4. The aerial image display device according to claim 1, wherein the processing circuitry executes the control of blurring, brightness or contrast on the image from the image display.

5. The aerial image display device according to claim 1, wherein
the aerial image formation optical system includes a beam splitter that splits incident light into transmitted light and reflected light and the retroreflective sheet, and the retroreflective sheet reflects incident light directly towards a direction of incidence.

6. The aerial image display device according to claim 1, wherein the aerial image formation optical system is a dihedral corner reflector array.

7. The aerial image display device according to claim 1, wherein the processing circuitry includes an image capturing element and calculates the viewpoint position information from information obtained by capturing an image of the observer as a subject.

8. The aerial image display device according to claim 2, wherein the processing circuitry includes an image capturing element and calculates the viewpoint position information from information obtained by capturing an image of the observer as a subject.

9. The aerial image display device according to claim 3, wherein the processing circuitry includes an image capturing element and calculates the viewpoint position information from information obtained by capturing an image of the observer as a subject.

10. The aerial image display device according to claim 4, wherein the processing circuitry includes an image capturing element and calculates the viewpoint position information from information obtained by capturing an image of the observer as a subject.

11. The aerial image display device according to claim 1, wherein the processing circuitry has a function of receiving wireless information from a wireless information transmission terminal carried by the observer and estimates the viewpoint position information from signal intensity of the wireless information.

12. The aerial image display device according to claim 2, wherein the processing circuitry has a function of receiving wireless information from a wireless information transmission terminal carried by the observer and estimates the viewpoint position information from signal intensity of the wireless information.

13. The aerial image display device according to claim 3, wherein the processing circuitry has a function of receiving wireless information from a wireless information transmission terminal carried by the observer and estimates the viewpoint position information from signal intensity of the wireless information.

14. The aerial image display device according to claim 4, wherein the processing circuitry has a function of receiving wireless information from a wireless information transmission terminal carried by the observer and estimates the viewpoint position information from signal intensity of the wireless information.

* * * * *